US00RE38449E

(19) United States
(12) Reissued Patent
Glenn

(10) Patent Number: US RE38,449 E
(45) Date of Reissued Patent: Mar. 2, 2004

(54) APPARATUS FOR APPLYING A MASKING ELEMENT

(76) Inventor: William G. Glenn, 1719 Niskey Lake Rd., Atlanta, GA (US) 30331

(21) Appl. No.: 10/209,725

(22) Filed: Jul. 31, 2002

Related U.S. Patent Documents

Reissue of:
(64) Patent No.: 6,206,990
Issued: Mar. 27, 2001
Appl. No.: 09/274,727
Filed: Mar. 23, 1999

(51) Int. Cl.[7] ..... B32B 31/00
(52) U.S. Cl. ..... 156/71; 156/574; 156/577
(58) Field of Search ..... 156/71, 574, 577, 156/554

(56) References Cited

U.S. PATENT DOCUMENTS

| | | | | | |
|---|---|---|---|---|---|
| 763,768 | A | * | 6/1904 | Kerns et al. | 269/76 |
| 803,270 | A | * | 10/1905 | Butler | 156/574 |
| 1,403,395 | A | * | 1/1922 | Egleston | 156/494 |
| 2,151,427 | A | | 3/1939 | Houk | |
| 2,498,595 | A | * | 2/1950 | Vircks | 269/59 |
| 3,241,519 | A | | 3/1966 | Lloyd | |
| 3,625,798 | A | * | 12/1971 | Ihli | 156/523 |
| 3,889,379 | A | | 6/1975 | Cline | |
| 4,050,972 | A | | 9/1977 | Cardinal, Jr. | |
| 4,078,355 | A | | 3/1978 | Clemensen | |
| 4,087,312 | A | * | 5/1978 | Maltese | 156/552 |
| 4,217,379 | A | | 8/1980 | Salvador | |
| 4,425,182 | A | * | 1/1984 | Jones et al. | 156/554 |
| 4,489,134 | A | * | 12/1984 | Yudenfriend | 428/412 |
| 4,572,761 | A | * | 2/1986 | Phillips, Sr. | 156/511 |
| 4,682,562 | A | | 7/1987 | Hell | |
| 4,913,767 | A | * | 4/1990 | Longworth | 156/527 |
| 4,954,204 | A | * | 9/1990 | Grimshaw | 156/361 |
| 4,981,545 | A | * | 1/1991 | Shinno et al. | 156/361 |
| 4,990,214 | A | * | 2/1991 | Heil et al. | 156/527 |
| 4,995,937 | A | * | 2/1991 | Persson | 156/543 |
| 5,445,703 | A | * | 8/1995 | Steeves et al. | 156/544 |
| 5,472,559 | A | * | 12/1995 | Cayford et al. | 156/554 |
| 5,478,432 | A | * | 12/1995 | Vester | 156/574 |
| 5,628,866 | A | * | 5/1997 | Pool | 156/527 |
| 5,795,435 | A | * | 8/1998 | Waters, Jr. | 156/577 |
| 6,039,102 | A | * | 3/2000 | Sadrakula et al. | 156/510 |
| 6,096,164 | A | * | 8/2000 | Benson et al. | 156/425 |
| 6,544,367 | B1 | * | 4/2003 | Fujimoto et al. | 156/187 |
| 2002/0066538 | A1 | * | 6/2002 | Lavelle | 156/574 |
| 2002/0079061 | A1 | * | 6/2002 | Arnott | 156/577 |

FOREIGN PATENT DOCUMENTS

| | | | | |
|---|---|---|---|---|
| SU | 608666 | * | 3/1992 | 156/577 |
| SU | 1719251 | * | 3/1992 | 156/574 |
| WO | WO 9922932 | * | 5/1999 | |

* cited by examiner

*Primary Examiner*—Mark A. Osele
(74) *Attorney, Agent, or Firm*—Troutman Sanders LLP; Joseph M. Lewinski, Esq.; Wm. Brook Lafferty, Esq.

(57) ABSTRACT

An apparatus is provided for applying a masking element adjacent a wall in a predetermined pattern. The masking element application apparatus includes first and second longitudinal members positioned at a predetermined distance from one another adjacent the wall and a dispenser for dispensing the masking element. The dispenser is carried laterally between said first and second longitudinal members and is slidable along said first and second longitudinal members from a first position to a second position. In operation, an end of the masking element may be attached to the wall when said dispenser is in said first longitudinal position and the masking element may be dispensed longitudinally along the wall by slidably moving said dispenser from said first position to said second position, thereby applying the masking element adjacent the wall in the predetermined pattern.

30 Claims, 5 Drawing Sheets

APPARATUS FOR APPLYING A MASKING ELEMENT

Matter enclosed in heavy brackets [ ] appears in the original patent but forms no part of this reissue specification; matter printed in italics indicates the additions made by reissue.

BACKGROUND OF THE INVENTION

1. Technical Field

This invention relates generally to an apparatus for applying a masking element and, in particular, to an apparatus for applying a masking element to a wall in a predetermined pattern to serve as a template to allow a user to apply paint in a decorative design.

2. Description of the Prior Art

Designs, such as stripes, are commonly applied to walls or other surfaces for decorative purposes. Decorative designs are most commonly applied to walls and similar surfaces through the use of adhesive wallpaper. However, wallpaper is relatively expensive and can be messy and complicated to apply. Additionally, it is generally not possible to effectively paint over wallpaper should it become desirable to redecorate in the future. Furthermore, the removal of wallpaper can be an even more messy and time intensive endeavor than its application, and may entail extensive rehabilitation of the wall surface to remove residual adhesive and to patch damaged areas.

These disadvantages may be avoided by painting a decorative pattern directly onto the wall. Painted patterns do not require the use of messy and difficult to remove adhesives. Furthermore, it is generally possible to redecorate a wall having a painted design by merely painting over the old design. However, while the artistically gifted may have little difficulty painting decorative patterns onto a wall freehand, it is considerably more difficult for less artistically inclined individuals to produce such painted patterns.

One method which has been used to simplify the application of paint in a predetermined pattern onto a surface involves the use of a masking element. Masking elements, such as stenciling tape, have been used to for many years to create decorative patterns on walls and other surfaces. Generally, masking elements are applied by hand to the surface in the desired pattern. Paint or stain is then applied to the surface either by spraying or by using a brush or other applicator. When the masking element is removed, a pattern is created wherein the areas which were covered by the masking element are free from paint or other coating. However, accurate alignment of the masking element to create a desired pattern typically requires precise measurement and can be difficult and time consuming for inexperienced users.

It is therefore an object of the present invention to provide an apparatus to facilitate the placement of a masking element onto a wall or similar surface which will be easily usable by an inexperienced operator to create a decorative design.

It is another object of the present invention to provide an apparatus for applying a masking element which will ensure the accurate spacing, alignment and placement of the masking element upon the wall or similar surface, as required to create a predetermined decorative design.

It is yet another object of the present invention to provide an apparatus for applying a masking element which will automatically apply pressure as necessary to adhere the masking element to the wall or similar surface.

It is yet another object of the present invention to provide an apparatus for applying a masking element which allows the user to quickly and easily sever the masking element as necessary during application.

SUMMARY OF THE INVENTION

The above objectives and others which will become clear in the following specification are accomplished according to the present invention by providing a masking element applicator for applying a masking element onto a surface in a predetermined pattern. The masking element applicator includes a first longitudinal member and a second longitudinal member for being spaced apart from one another and positioned adjacent the surface and a dispenser assembly for dispensing the masking element. The dispenser assembly is carried laterally between the first and second longitudinal members, and is slidable along the first and second longitudinal members from a first longitudinal position to a second longitudinal position. In operation, an end of the masking element is attached to the surface when the dispenser assembly is in the first longitudinal position and the masking element is dispensed longitudinally along the surface by slidably moving the dispenser assembly from the first longitudinal position to the second longitudinal position, thereby applying the masking element onto the surface in the predetermined pattern.

BRIEF DESCRIPTION OF THE DRAWINGS

The device designed to carry out the invention will hereinafter be described, together with the salient features thereof. The invention will be more readily understood from a reading of the following specification and by reference to the accompanying drawings forming a part thereof, wherein an example of the invention is shown.

DETAILED DESCRIPTION OF PREFERRED EMBODIMENT

Figure 1:
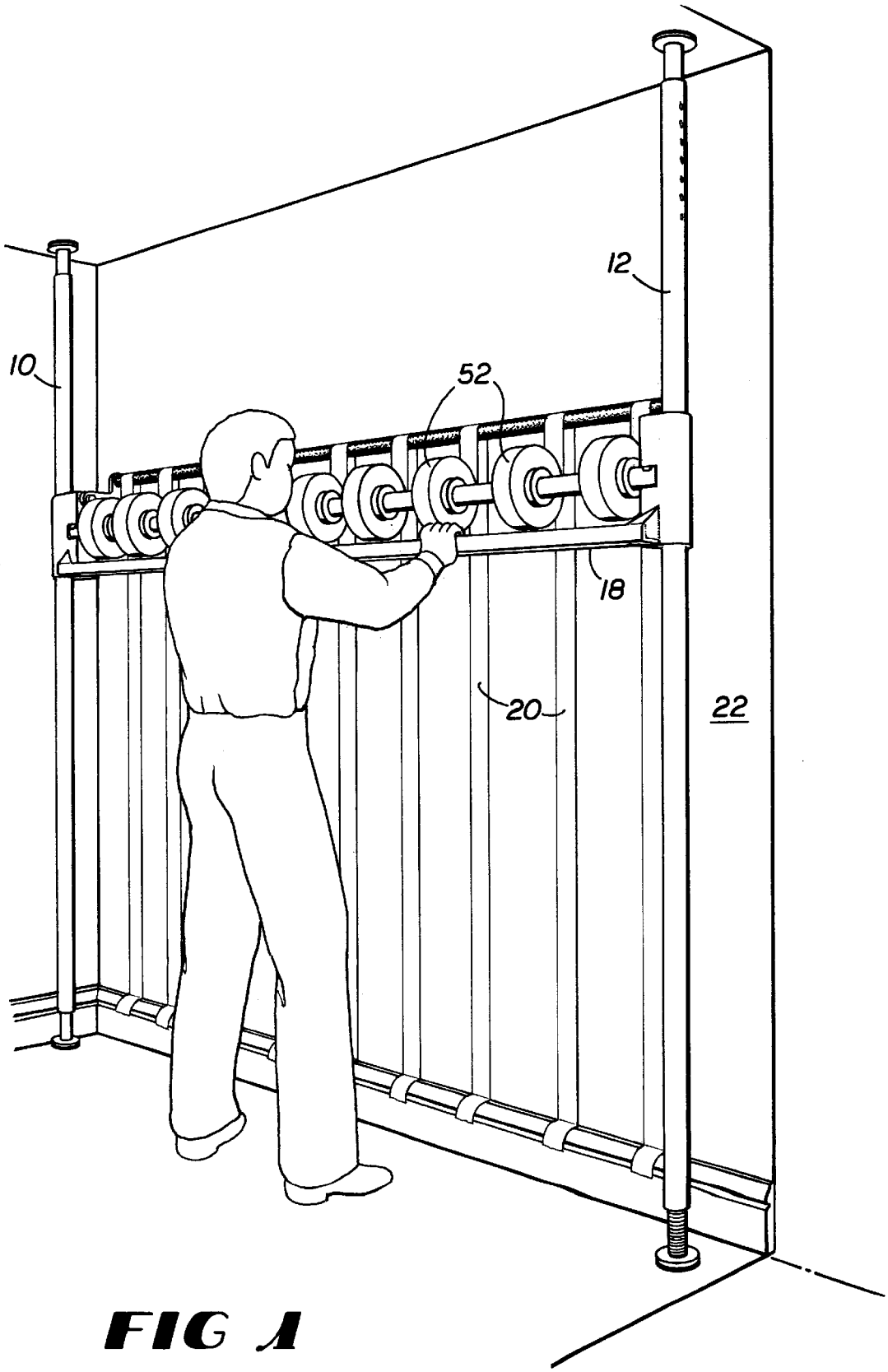
FIG. 1 is a three dimensional perspective view of a user applying a masking element to a wall in a predetermined pattern using a masking element applicator in accordance with a preferred embodiment of the present invention.

Referring now in more detail to the drawings, the invention will now be described in more detail. FIG. 1 illustrates a three dimensional partial perspective view of a masking element applicator A in accordance with a preferred embodiment of the present invention. The masking element applicator A includes two vertical support columns 10 and 12 which slidably support a dispenser assembly 18 disposed laterally therebetween for dispensing masking element 20 onto a wall surface. Dispenser assembly 18 may preferably include a plurality of dispenser adapters 52 for supplying masking element 20 and for allowing placement of a masking element 20 onto an adjacent wall surface 22 in a predetermined pattern.

As shown in FIG. 1, vertical support columns 10 and 12 are provided to serve as framework to slidably support dispenser assembly 18 adjacent a wall surface 22. In operation, an end of each masking element 20 is affixed to an edge of wall surface 22. Dispenser assembly 18 may be then translated vertically along the length of vertical support columns 10 and 12 to apply masking element 20 in parallel strips spaced in the selected pattern.

Figure 2:
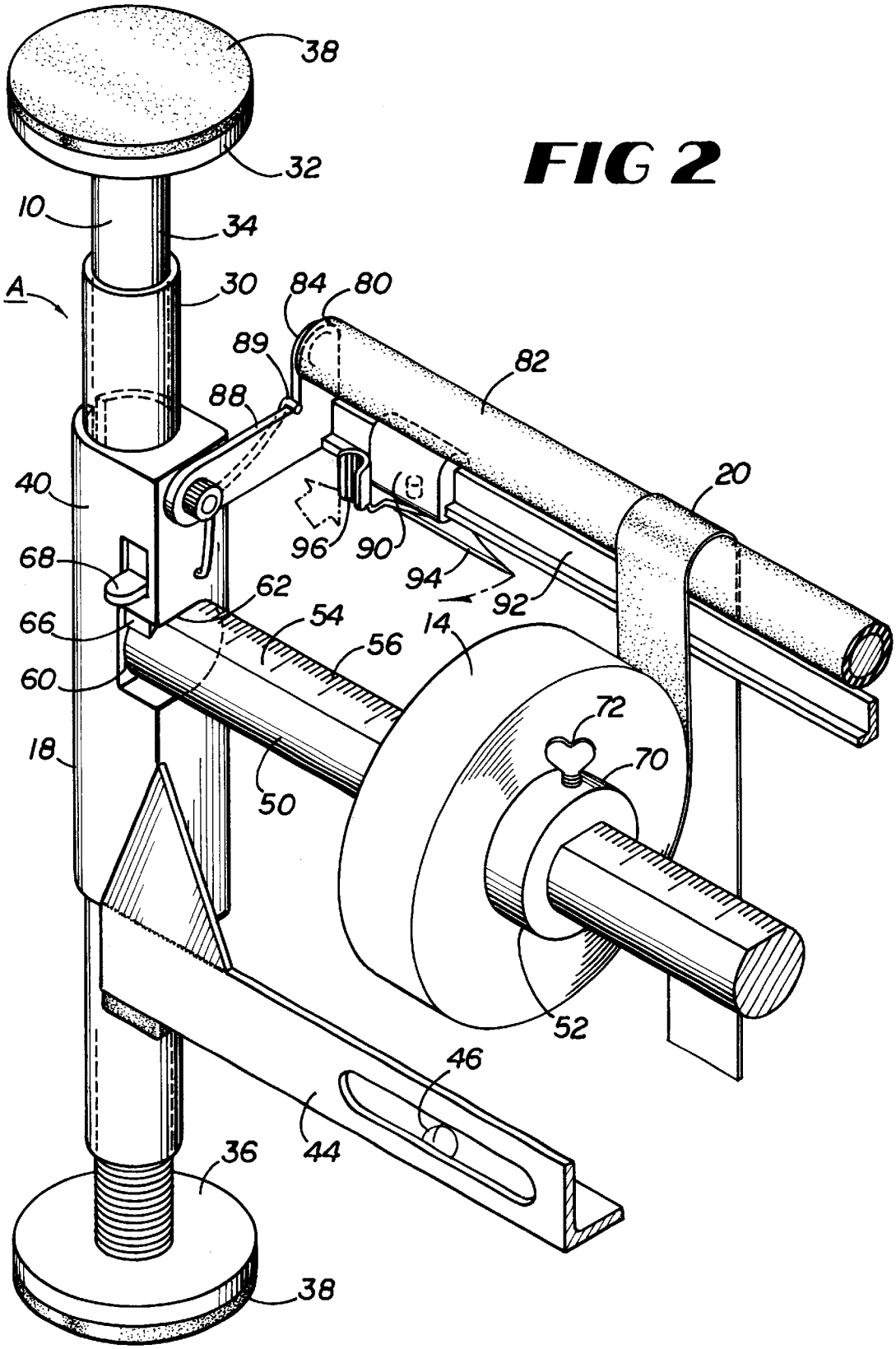
FIG. 2 is a three dimensional partial perspective view of a masking element applicator in accordance with a preferred embodiment of the present invention.
Figure 3:
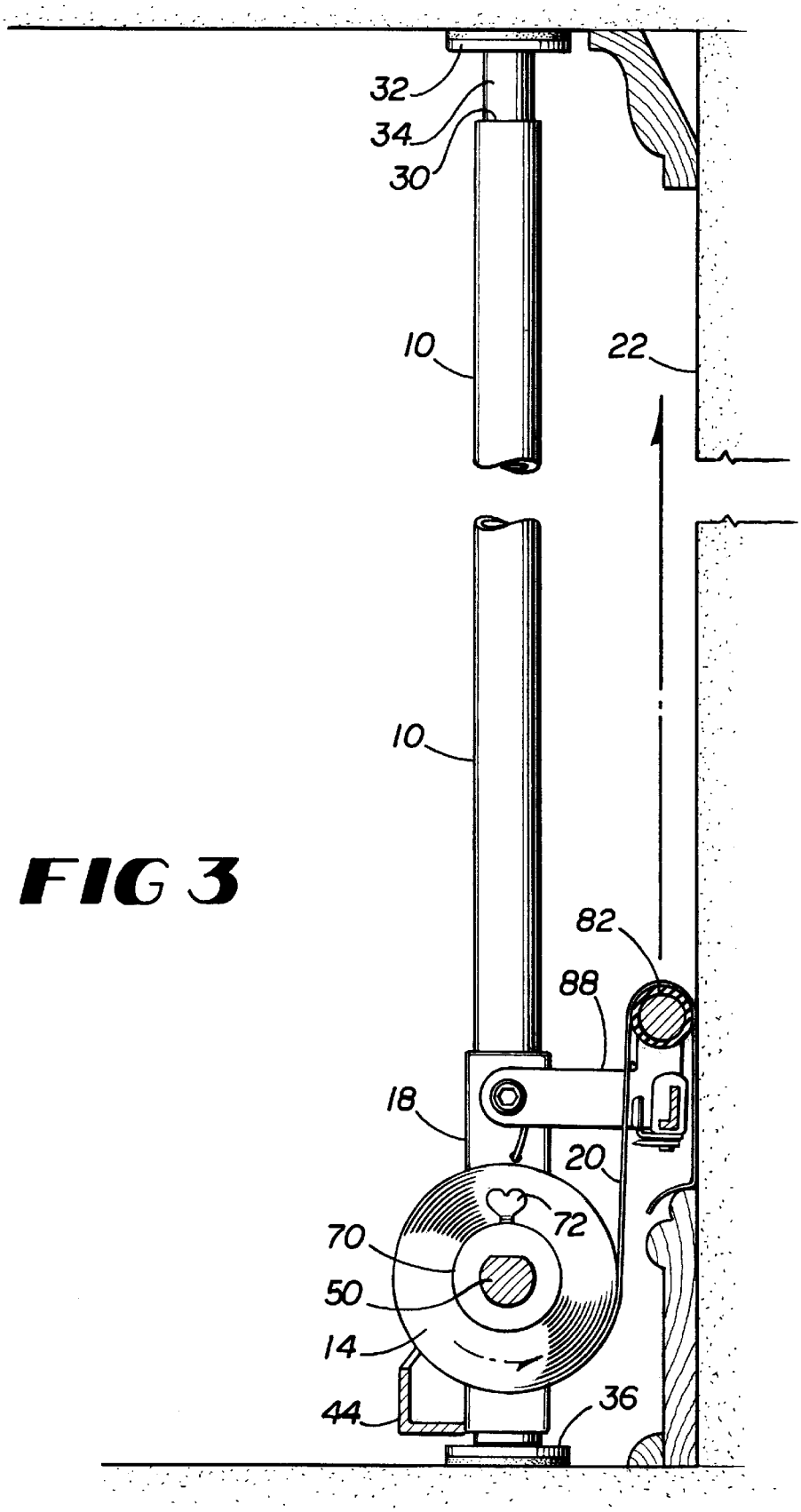
FIG. 3 is a side elevation view of the masking element applicator of FIG. 1 installed adjacent a wall.
Figure 4:
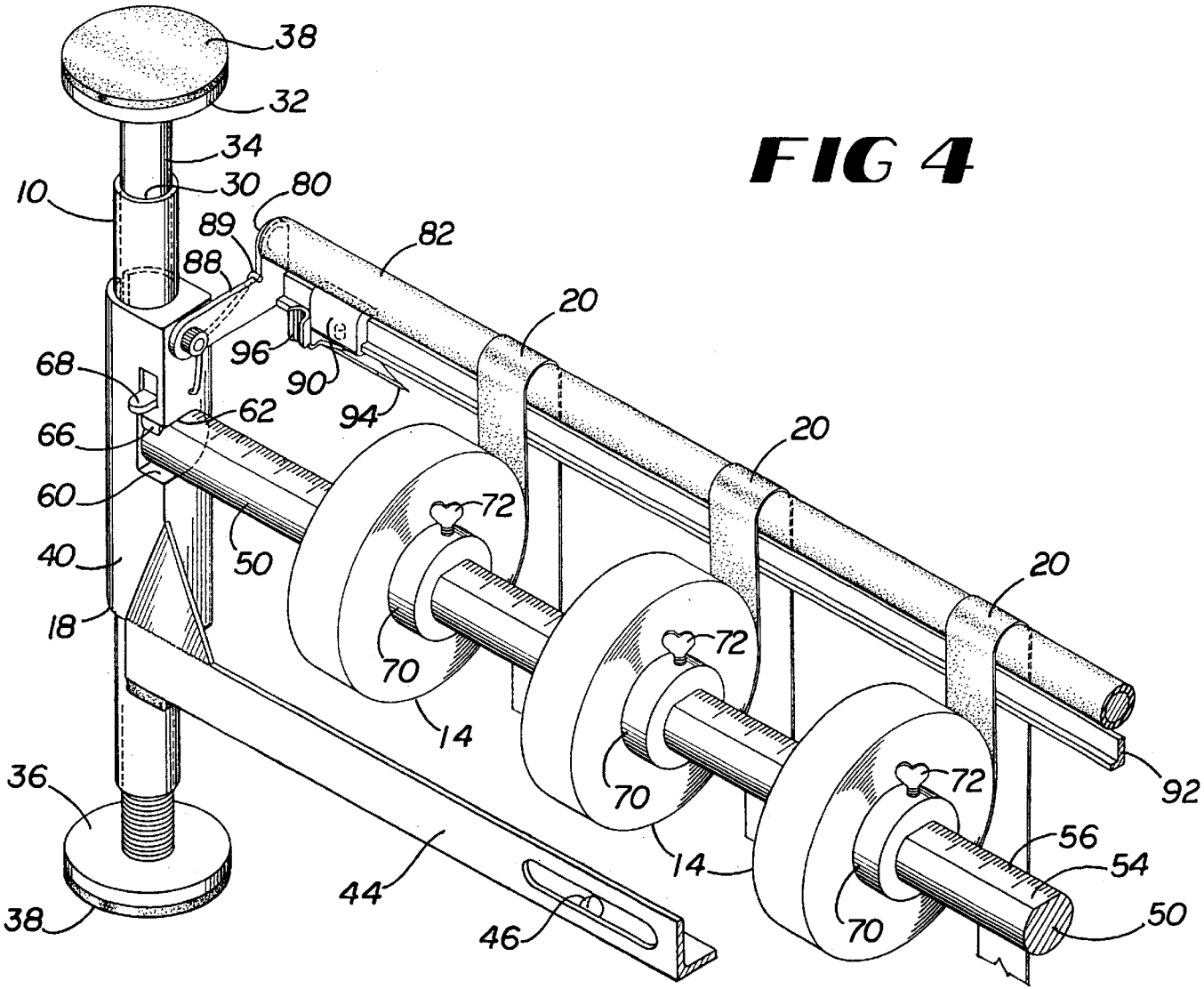
FIG. 4 is a three dimensional partial perspective view of a masking element applicator illustrating its use to apply a plurality of masking elements in accordance with a preferred embodiment of the present invention.

As shown in FIGS. 2–4, in a preferred embodiment, each vertical support column 10 and 12 (not shown) includes a longitudinal member including a telescoping spring loaded column 30. An upper pressure pad assembly 32 is provided at the upper end 34 of telescoping spring loaded column 30 for stably engaging a ceiling adjacent wall surface 22. A threaded adjustable foot assembly 36 is provided at the lower end of telescoping spring loaded column 30 for stably engaging a floor adjacent wall surface 22. Each upper pressure pad assembly 34 and threaded adjustable foot assembly 36 includes a high friction pad 38 for providing added stability to the vertical support column 10 or 12 by preventing sliding of the column ends. High friction pads 38 also serve to protect the finish of the respective ceiling or floor surfaces against which the columns 10 and 12 are installed. Either or both of vertical support columns 10 and 12 may optionally include a leveling device such as a leveling bubble or plumb bob to assist a user in vertically positioning vertical support columns 10 and 12.

As shown in FIGS. 2 and 4, dispenser assembly 18 functions as a dispenser for applying masking element 20 to wall surface 22. Dispenser assembly 18 includes opposingly positioned column guides 40 which are each slidably carried by a respective vertical support column 10 or 12. Column guides 40 carry angle beam frame 44 which extends horizontally therebetween and is disposed perpendicular to the longitudinal axes of vertical support columns 10 and 12. Column guides 40 are preferably of sufficient length to ensure that angle beam frame 44 is maintained in a substantially perpendicular relationship to support columns 10 and 12. A leveling bubble 46 is provided with angle beam frame 44 to allow a user to ensure level placement of dispenser assembly 18.

Figure 6:
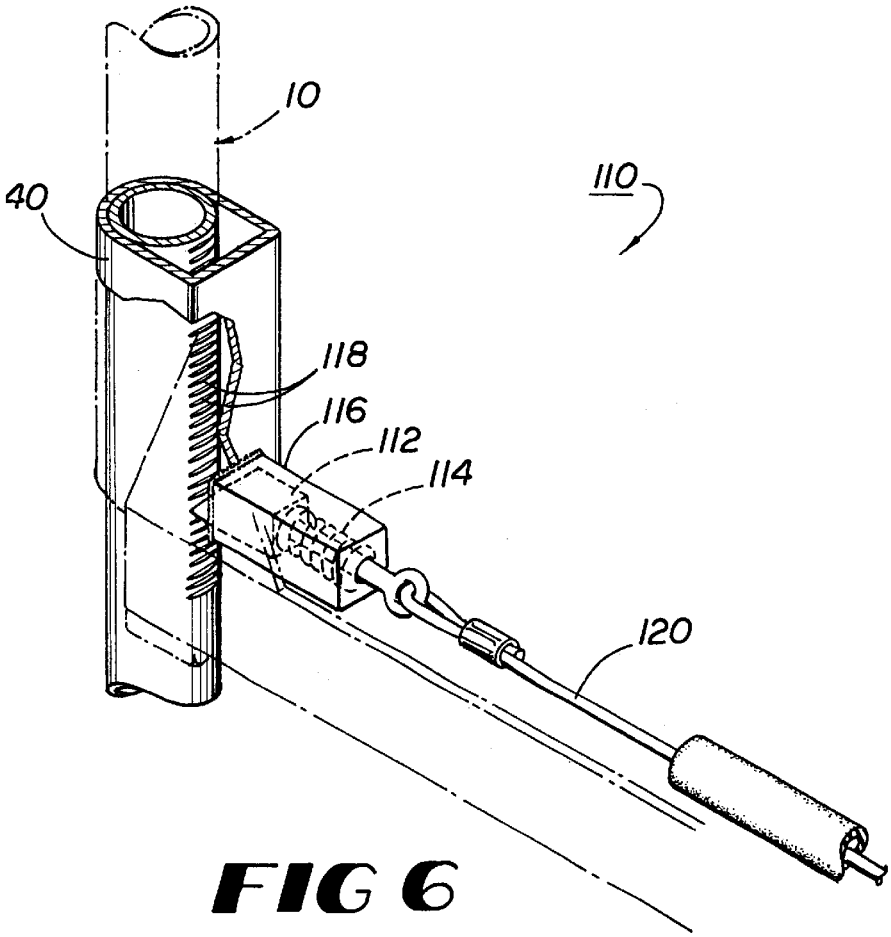
FIG. 6 is a perspective view of a vertical support column ratchet mechanism in accordance with yet another embodiment of the masking element applicator.

As shown in FIG. 6, in an alternative embodiment dispenser assembly 18 may include a releasable ratchet mechanism 110 whereby it may be freely lifted but prevented from moving downward unless the ratchet mechanism 110 is disengaged. In the embodiment of FIG. 6, a ratchet mechanism 110 is carried by each column guide 40. Each ratchet mechanism 110 includes a ratchet pall 112 which is biased by a spring 114 and enclosed in a ratchet pall box 116. When engaged, the ratchet pall 112 interacts with ratchet teeth 118 extending from the surface of its respective vertical support column 10 or 12 to prevent downward motion of dispenser assembly 18. A delatching cable 120 is provided, connecting the ratchet pall 112 to the ratchet pall 112 of the opposing respective column guide 10 or 12. When delatching cable 120 is pulled, tension is applied to each ratchet pall 112, disengaging the ratchet pall 112 from the ratchet teeth 118 of its respective vertical support column 10 or 12, thereby allowing free movement of dispenser assembly 18 along vertical support columns 10 and 12.

As shown in FIGS. 2 and 4, dispenser assembly 18 also includes a masking element support bar 50 which supports a plurality of dispenser adapters 52 for supplying masking element 20 as necessary during operation. In a preferred embodiment, masking element support bar 50 has a "D" shaped cross section having an upper surface 54. Upper surface 54 may bear roll spacing indicia 56 to act as alignment guides to assist a user in accurately positioning dispenser adapters 52 in a desired pattern. Masking element support bar 50 includes oppositely disposed ends 60 which are each releasably carried by a respective column guides 40. In a preferred embodiment, each column guide 40 includes a masking element support bar receiving recess 62 which is disposed to receive a respective end 60 of masking element support bar 50. Each recess 62 includes a spring loaded latch tooth 66 which retains masking element support bar 50 and is releasable via a latch tooth release knob 68.

Each masking element dispenser adapter 52 is sized to support a masking element roll 14 while simultaneously allowing free rotation of masking element roll 14 about the longitudinal axis of masking element support bar 50. In the preferred embodiment, each dispenser adapter 52 includes a "D" shaped collar 70 which slidably mounts onto the "D" shaped shaft of masking element support bar 50. Each dispenser adapter 52 also includes a set screw 72 whereby the dispenser adapter 52 may be fixedly positioned at a desired location along the length of masking element support bar 50.

In the preferred embodiment, each masking element roll 14 comprises a roll of masking tape or of a specialty stenciling tape. Solid tape may be used to create a simple design or, alternatively, specialty tape having cut-out designs may be used to create more complex patterns. However, in either case, the pattern created will necessarily be limited to stripes or stripe-based patterns.

Dispensing assembly 18 also includes pressure roller assembly 80 for guiding masking element 20 into a desired position adjacent wall surface 22 and for applying pressure to adhere masking element 20 to wall surface 22. In a preferred embodiment, pressure roller assembly 80 includes pressure roller 82 having opposing ends 84 which each include an opposing pressure roll support arm 88 is pivotably connected to its respective column guide 40 and is supported in an extended position by a torsion spring 89. When placed adjacent wall surface 22, torsion spring 89 applies force through its respective pressure roll support arm 88 to pressure roller 82, thereby applying pressure to adhere masking element 20 to wall surface 22.

In an alternative embodiment (not shown) the lengths of angle beam frame 44, masking element support bar 50, and pressure roller 82 are adjustable to allow for adjustment of the relative lateral spacing of vertical support columns 10 and 12. To allow for this lateral adjustment, angle beam frame 44, masking element support bar 50, and pressure roller 82 may each include telescoping segments to allow adjustment to a desired length.

Figure 5:
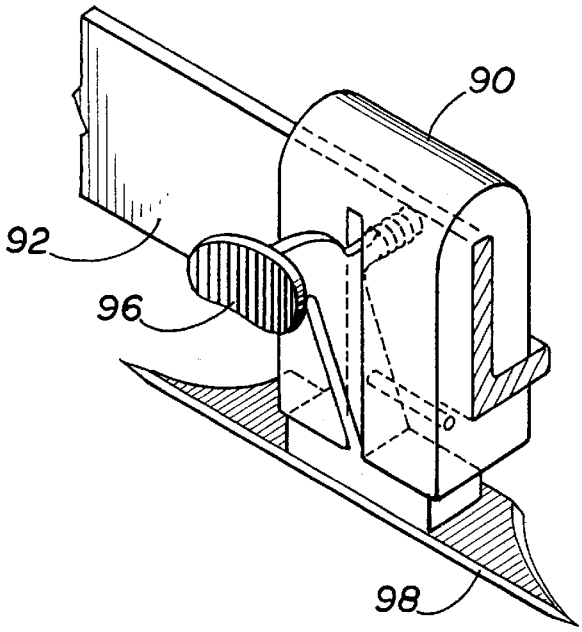
FIG. 5 is a three dimensional perspective view of an alternative bidirectional cutter in accordance with another embodiment of the masking element applicator.

As shown in FIG. 2, in a preferred embodiment, pressure roller assembly 80 also includes blade assembly 90 for slicing masking element 20 when fully extended as desired along wall surface 22. Blade assembly 90 includes a blade slide bar 92 extending laterally between opposing pressure roller support arms 84. Tape cutter blade 94 is slidably mounted upon cutter slide bar 90 and includes a blade actuator finger button 96 whereby a user may slide tape cutter blade 94 laterally along blade slide bar 92 to sever the plurality of masking elements 20. In an alternative embodiment, shown in FIG. 5, tape cutter blade 94 includes a bi-directional blade 98 which may be used to sever masking elements 20 by moving to either side along blade slide bar 92.

As illustrated in FIGS. 1, 2 and 4, the above described masking element applicator A may be used to apply parallel strips of masking element 20 onto a wall surface 22 according to the following method. First, the apparatus for applying a masking element A is positioned adjacent a wall surface such that vertical support columns 10 and 12 are positioned with the desired spacing of the pattern to be applied to wall surface 22. Prior to installation, the length of vertical support columns 10 and 12 are adjusted, if necessary, by adjusting their respective threaded adjustable foot assemblies 36 to alter the overall length of vertical support columns 10 and 12. The upper end 34 of each telescoping spring loaded column 30 is then compressed and allowed to re-extend, bringing pressure pad assembly 34 into firm engagement with the ceiling surface and foot assembly 36 into firm engagement with the floor surface.

Next, one or more dispenser adapters 52 are loaded with masking element rolls 14 and are then installed onto masking element support bar 50. Each dispenser adapter 52 may be positioned laterally as necessary for the desired pattern by sliding along the length of masking element support bar 50 using roll spacing indicia 56 as a guide. The respective dispenser adapter 52 is then locked into position by tightening set screw 72. Dispenser assembly 18 is then attached to each vertical support column 10 and 12 via recess 62 of the respective column guide 40. Leveling bubble 46 of angle beam frame 44 may be used to verify the accuracy of horizontal placement of masking assembly 18 and the concomitant vertical placement of vertical support columns 10 and 12.

Next, as shown in FIGS. 1, 2 and 4, the leading edge of each masking element 14 is threaded over pressure roller assembly 80 and affixed at the base of wall surface 22 with dispenser assembly 18 positioned in a first longitudinal position. Pressure roller assembly 80 is held against wall surface 22 by the interaction of torsion spring 86 and pressure roll support arm 84, applying pressure to cause each masking element 20 to adhere to wall surface 22. Once the leading edge of each masking element 14 has been affixed to wall surface 22, dispenser assembly 18 is be lifted vertically to a second longitudinal position to dispense the masking elements 20 vertically and linearly along the wall surface in the desired pattern. As dispenser assembly 18 is lifted, pressure roller assembly 80 serves to both guide masking element 20 into alignment with wall surface 22 and to apply pressure to adhere masking element 20 to wall surface 22. As dispenser assembly 18 is lifted, each masking element dispenser will rotate to supply masking element 20 as required. Dispenser assembly 18 may generally be lifted until roller assembly 80 contact the ceiling adjacent wall surface 22. However, due to its configuration, pressure roller assembly 80 will collide with the adjacent ceiling surface, thereby preventing a small portion of each masking element 20 from adhering at the top edge of wall surface 22.

After masking assembly 18 has been lifted as far as possible along wall surface 22, the user may cut the masking elements 20 by engaging blade actuator 96 and using it to slide tape cutter blade 94 laterally along blade slide bar 92, severing the masking elements. In an alternative embodiment (not shown) an actuator cord and pulley system may be included to allow the operator to move tape cutter blade 94 laterally along blade slide bar 92 from ground level. Blade assembly 90 is positioned such that an excess portion of each masking element will produced beyond that needed to reach the top of wall surface 22. The excess portion may be used to allow the user to manually adhere the small unadhered portion of masking element 20 at the top edge of wall surface 22. Additionally, any excess masking element 20 may be folded over to form a tab to facilitate removal of the masking element 20 after application of paint or a similar coating to the wall surface.

The masking element applicator A may then be moved to a new position to allow application of the masking agent to a section of the wall surface 22 adjacent that which has previously been applied. It is unnecessary to completely disassemble the masking element applicator A in order to move it to a new section of wall surface 22. The masking element applicator A may be moved by simply manually collapsing the spring loaded telescoping portions 30 of each vertical support column 10, repositioning vertical support columns 10, and then allowing the telescoping portions 30 of vertical support columns 10 to re-extend thereby securing the masking element applicator A in the new position. Successive portions of wall can be successively treated in this manner as necessary to apply the masking element 20 to the entire length of wall surface 22.

Thus it can be seen that an advantageous method may be had, according to the present invention, for applying a masking element to a wall surface in a desired pattern. The apparatus for applying a masking element is positioned adjacent a wall, the leading end of the masking element is affixed to and edge of the wall, and a masking element dispenser is moved along the wall dispensing the masking element in straight, parallel lines along the wall surface.

What have been described above are preferred embodiments of the present invention. It is, of course, not possible to describe every conceivable combination of methodologies for purposes of describing the present invention. However, one of ordinary skill in the art will recognize that many further combinations, permutations and modifications of the present invention are possible. Therefore, all such possible combinations, permutations and modifications are to be included within the scope of the invention, as defined by the claims below.

What is claimed is:

1. An apparatus for applying a masking element onto a surface in a predetermined pattern, said apparatus comprising:

a first longitudinal member and a second longitudinal member, said first and second longitudinal members for being spaced apart from one another and positioned adjacent the surface; and a dispenser assembly for dispensing the masking element, said dispenser assembly carried laterally between said first and second longitudinal members, said dispenser assembly being slidable along said first and a second longitudinal members from a first position to a second position, wherein said dispenser assembly includes a plurality of dispenser adapters for carrying a plurality of rolls of the masking element;

whereby an end of the masking element may be attached to the surface when said dispenser assembly is in said first longitudinal position and the masking element may be dispensed longitudinally along the surface by slidably moving said dispenser assembly from said first position to said second position, thereby applying the masking element onto the surface in a predetermined pattern.

2. The apparatus for applying a masking element of claim 1, wherein said dispenser assembly includes a plurality of dispenser adapters for carrying rolls for creating a predetermined pattern.

3. The apparatus for applying a masking element of claim 1, wherein said dispenser assembly includes a plurality of dispenser adapters for carrying rolls of a masking element comprising an adhesive tape.

4. The apparatus for applying a masking element of claim 1, wherein the length of said first and second longitudinal members is adjustable for generally matching a dimension of the surface.

5. The apparatus for applying a masking element of claim 1, wherein said dispenser assembly further includes a blade assembly for severing the masking element at a desired longitudinal position.

6. An apparatus for applying a masking element onto a surface in a predetermined pattern, said apparatus comprising:

a first longitudinal member and a second longitudinal member, said first and second longitudinal members for being spaced apart from one another and positioned adjacent the surface; and a dispenser assembly for dispensing the masking element, said dispenser assembly carried laterally between said first and second longitudinal members, said dispenser assembly being slidable along said first and second longitudinal members from a first position to a second position, said dispenser assembly including a plurality of dispenser adapters for carrying a plurality of rolls of the masking element and a pressure roller for applying pressure to the masking element to facilitate adhesion of the masking element to the surface;

whereby an end of the masking element may be attached to the surface when said dispenser assembly is in said first longitudinal position and the masking element may be dispensed longitudinally along the surface by slidably moving said dispenser assembly from said first position to said second position, thereby applying the masking element onto the surface in the predetermined pattern.

7. The apparatus for applying a masking element of claim 6, wherein said dispenser assembly includes alignment guides for facilitating the positioning of said plurality of rolls for creating a predetermined pattern.

8. The apparatus for applying a masking element of claim 6, wherein said dispenser adapters are adapted for carrying rolls of a masking element comprising an adhesive tape.

9. The apparatus for applying a masking element of claim 6, wherein the length of said first and second longitudinal members is adjustable for generally matching a dimension of the surface.

10. The apparatus for applying a masking element of claim 6, wherein said dispenser assembly further includes a blade assembly for severing the masking element at a desired longitudinal position.

11. A method for aligning and applying a plurality of masking elements onto a wall in a predetermined pattern, said method comprising the steps of:

providing a masking element applicator having first and second columns slidably carrying a plurality of masking element dispensers therebetween;

positioning said first and second columns adjacent the wall such that said first and second columns extend generally from the top of said wall to the bottom of said wall;

attaching a portion of the masking element from each of said masking element dispensers to the wall; and sliding said plurality of masking element dispensers from a position adjacent the bottom of the wall to a second position adjacent the bottom of the wall to a second position adjacent the top of the wall so that said masking elements extend vertically and linearly along the wall.

12. The method for aligning and positioning a plurality of masking elements of claim 11, further including the step of applying pressure to the masking elements to facilitate adhesion of the masking elements to the wall.

13. The method for aligning and positioning a plurality of masking elements of claim 11, further including the step of repositioning said first and second columns to an adjacent section of the wall following application of the masking elements.

[14. The method for aligning and positioning a plurality of masking elements of claim 11, further including the step of repositioning said first and second columns to an adjacent section of the wall following application of the masking elements.]

15. The method for aligning and positioning a plurality of masking elements of claim 11, further including the step of adjusting the length of said first and second columns.

16. The method for aligning and positioning a plurality of masking elements of claim 11, further including the step of severing the masking elements at a desired height.

17. An apparatus for applying a masking element onto a surface in a predetermined pattern, said apparatus comprising:

a first longitudinal member and a second longitudinal member, said first and second longitudinal members for being spaced apart from one another and positioned adjacent the surface; and a dispenser assembly for dispensing the masking element, said dispenser assembly carried laterally between said first and second longitudinal members, said dispenser assembly being slidable along said first and second longitudinal members from a first position to a second position, wherein said dispenser assembly includes a leveling indicator to aid in the alignment of said dispenser assembly;

whereby an end of the masking element may be attached to the surface when said dispenser assembly is in said first longitudinal position and the masking element may be dispensed longitudinally along the surface by slidably moving said dispenser assembly from said first position to said second position, thereby applying the masking element onto the surface in the predetermined pattern.

18. A method for aligning and applying an adhesive tape onto a wall in a predetermined pattern, said method comprising the steps of:

providing an adhesive tape applicator having first and second columns slidably carrying a masking element dispenser assembly therebetween;

positioning said first and second columns adjacent the wall such that said first and second columns extend generally from the top of said wall to the bottom of said wall;

attaching a portion of the adhesive tape from said adhesive tape dispenser assembly to the wall; and sliding said adhesive tape dispenser assembly from a position adjacent the bottom of the wall to a second position adjacent the top of the wall so that said adhesive tape extends vertically and linearly along the wall.

*19. A dispenser assembly for dispensing a masking element to a surface in a predetermined manner, said dispenser assembly comprising a plurality of dispenser adapters for carrying a plurality of rolls of said masking element, said dispenser assembly adapted to attach an end of said masking element to the surface when said dispenser assembly is*

*in a first position and to dispense said masking element in a longitudinal manner along the surface such that said masking elements from each said dispenser adapter are displaced from one another as said dispenser assembly is moving from said first position to a second position, whereby said masking element is applied to the surface in a predetermined manner.*

*20. The dispenser assembly of claim 19 further comprising alignment guides for facilitating the positioning of said plurality of rolls for creating the predetermined pattern.*

*21. The dispenser assembly of claim 19 wherein said plurality of dispenser adapters for carrying rolls comprises an adhesive tape.*

*22. The dispenser assembly of claim 19 further comprising a blade assembly for severing said masking element at a desired longitudinal position.*

*23. A dispenser assembly for dispensing a masking element onto a surface in a predetermined manner, said dispenser assembly comprising a plurality of dispenser adapters for carrying a plurality of rolls of said masking element and a pressure roller for applying pressure to said masking element to facilitate adhesion of the masking element to the surface, said dispenser assembly adapted to attach an end of said masking element to the surface when said dispenser assembly is in a first position and to dispense said masking element in a longitudinal manner along the surface such that said masking elements from each said dispenser adapter are displaced from one another as said dispenser assembly is moving from said first position to a second position, whereby said masking element is applied to the surface in a predetermined manner.*

*24. The dispenser assembly of claim 23 further comprising alignment guides for facilitating the positioning of said plurality of rolls for creating the predetermined pattern.*

*25. The dispenser assembly of claim 23 wherein said plurality of dispenser adapters for carrying rolls comprises an adhesive tape.*

*26. The dispenser assembly of claim 23 further comprising a blade assembly for severing said masking element at a desired longitudinal position.*

*27. A method for aligning and applying a masking element onto a surface in a predetermined pattern, said method comprising the steps of:*

*providing a plurality of masking element dispensers adjacent a surface;*

*attaching a portion of the masking element from each of said masking element dispensers to the surface such that said masking elements will be displaced from one another when applied to the surface; and*

*moving said plurality of masking element dispensers from a first position on the surface to a second position on the surface such that said masking elements extend substantially linearly along the surface.*

*28. The method of claim 27 further comprising the step of applying pressure to the masking element to facilitate adhesion of the masking element to the surface.*

*29. The method of claim 27 further comprising the step of severing the masking element at a desired height.*

*30. A dispenser assembly for dispensing a masking element to a surface in a predetermined manner, said dispenser assembly comprising a plurality of dispenser adapters for carrying a plurality of rolls of said masking element and a leveling indicator to aid in the alignment of said dispenser assembly, said dispenser assembly adapted to attach an end of said masking element to the surface when said dispenser assembly is in a first position and to dispense said masking element in a longitudinal manner along the surface as said dispenser assembly is moving from said first position to a second position, whereby said masking element is applied to the surface in a predetermined manner.*

*31. A method for aligning and applying an adhesive tape onto a surface in a predetermined manner, said method comprising the steps of:*

*attaching to the surface a portion of the adhesive tape from a plurally of dispenser adapters of an adhesive tape dispenser assembly such that said adhesive tape from each said dispenser adapter will be displaced from one another when applied to the surface; and*

*moving said adhesive tape dispenser assembly from a first position on the surface to a second position on the surface such that said adhesive tape extends substantially linearly along the surface.*

* * * * *